United States Patent
McCune et al.

(10) Patent No.: US 8,939,864 B2
(45) Date of Patent: Jan. 27, 2015

(54) GAS TURBINE ENGINE LUBRICATION

(75) Inventors: Michael E. McCune, Colchester, CT (US); Lawrence E. Portlock, Bethany, CT (US); Frederick M. Schwarz, Glastonbury, CT (US)

(73) Assignee: United Technologies Corporation, Hartford, CT (US)

( * ) Notice: Subject to any disclaimer, the term of this patent is extended or adjusted under 35 U.S.C. 154(b) by 86 days.

(21) Appl. No.: 13/340,743

(22) Filed: Dec. 30, 2011

(65) Prior Publication Data

US 2012/0275904 A1 Nov. 1, 2012

Related U.S. Application Data

(63) Continuation-in-part of application No. 11/504,220, filed on Aug. 15, 2006, now Pat. No. 8,753,243.

(51) Int. Cl.
| | |
|---|---|
| *F16H 57/08* | (2006.01) |
| *F01D 5/02* | (2006.01) |
| *F01D 25/18* | (2006.01) |
| *F16H 57/04* | (2010.01) |

(52) U.S. Cl.
CPC ............... *F01D 5/027* (2013.01); *F01D 25/18* (2013.01); *F05D 2220/36* (2013.01); *F05D 2260/40311* (2013.01); *F05D 2260/98* (2013.01); *F16H 57/0423* (2013.01); *F16H 57/0479* (2013.01); *F16H 57/0486* (2013.01); *F16H 2057/085* (2013.01); *F05D 2240/70* (2013.01); *F05D 2260/34* (2013.01)
USPC .......................... 475/331; 60/226.1; 60/226.3

(58) Field of Classification Search
USPC ............................................ 60/226.1, 226.3
See application file for complete search history.

(56) References Cited

U.S. PATENT DOCUMENTS

| | | | |
|---|---|---|---|
| 2,684,591 | A | 7/1954 | Lundquist |
| 3,160,026 | A | 12/1964 | Rosen |
| 3,352,178 | A | 11/1967 | Lindgren et al. |
| 3,722,323 | A | 3/1973 | Welch |
| 4,583,413 | A | 4/1986 | Lack |

(Continued)

FOREIGN PATENT DOCUMENTS

| | | |
|---|---|---|
| CN | 1952435 A | 4/2007 |
| EP | 1114949 | 7/2001 |

(Continued)

OTHER PUBLICATIONS

Dudley, ("Gear Handbook: The design, Manufacture, and Application of Gears", p. 3-15).*

(Continued)

*Primary Examiner* — Derek D Knight
(74) *Attorney, Agent, or Firm* — Carlson, Gaskey & Olds, P.C.

(57) ABSTRACT

A turbine engine includes a fan shaft and at least one tapered bearing mounted on the fan shaft. The fan shaft includes at least one radially extending passage adjacent the at least one tapered bearing. A fan is mounted for rotation on the tapered bearing. An epicyclic gear train is coupled to drive the fan. The epicyclic gear train includes a carrier that supports star gears that mesh with a sun gear, and a ring gear that surrounds and meshes with the star gears. Each of the star gears is supported on a respective journal bearing. The epicyclic gear train defines a gear reduction ratio of greater than or equal to about 2.3.

12 Claims, 2 Drawing Sheets

(56) References Cited

U.S. PATENT DOCUMENTS

| | | | |
|---|---|---|---|
| 4,896,499 | A | 1/1990 | Rice |
| 5,081,832 | A | 1/1992 | Mowill |
| 5,211,541 | A | 5/1993 | Fledderjohn et al. |
| 5,302,031 | A | 4/1994 | Yuasa |
| 5,391,125 | A | 2/1995 | Turra et al. |
| 5,433,674 | A | 7/1995 | Sheridan et al. |
| 5,466,198 | A | 11/1995 | McKibbin et al. |
| 5,472,383 | A | 12/1995 | McKibbin |
| 6,223,616 | B1 | 5/2001 | Sheridan |
| 6,402,654 | B1 | 6/2002 | Lanzon et al. |
| 6,530,858 | B1 | 3/2003 | Uroso et al. |
| 6,669,597 | B1 | 12/2003 | Uroso et al. |
| 6,732,502 | B2 * | 5/2004 | Seda et al. ............ 60/226.1 |
| 7,021,042 | B2 | 4/2006 | Law |
| 7,591,754 | B2 | 9/2009 | Duong et al. |
| 7,662,059 | B2 | 2/2010 | McCune |
| 7,704,178 | B2 | 4/2010 | Sheridan et al. |
| 8,074,440 | B2 | 12/2011 | Kohlenberg |
| 2002/0064327 | A1 | 5/2002 | Toda et al. |
| 2004/0112041 | A1 | 6/2004 | Law |
| 2005/0026745 | A1 | 2/2005 | Mitrovic |
| 2008/0006018 | A1 * | 1/2008 | Sheridan et al. ............ 60/39.1 |
| 2008/0044276 | A1 | 2/2008 | McCune et al. |
| 2008/0096714 | A1 | 4/2008 | McCune |
| 2008/0116009 | A1 | 5/2008 | Sheridan et al. |
| 2009/0056306 | A1 | 3/2009 | Suciu et al. |
| 2009/0081039 | A1 | 3/2009 | McCune et al. |
| 2009/0090096 | A1 | 4/2009 | Sheridan |
| 2009/0111639 | A1 | 4/2009 | Klingels |
| 2009/0293278 | A1 | 12/2009 | Duong et al. |
| 2009/0298640 | A1 | 12/2009 | Duong et al. |
| 2011/0130246 | A1 | 6/2011 | McCune |

FOREIGN PATENT DOCUMENTS

| | | | |
|---|---|---|---|
| EP | 1876338 | A2 | 1/2008 |
| EP | 1890054 | | 2/2008 |
| EP | 1925855 | | 5/2008 |
| EP | 2224100 | | 9/2010 |
| EP | 2559913 | A1 | 2/2013 |
| FR | 1357038 | | 4/1964 |
| JP | 46-36927 | | 10/1971 |
| JP | 5-248267 | A | 9/1993 |
| JP | 9-317833 | A | 12/1997 |
| JP | 2001-208146 | A | 8/2001 |
| JP | 39-20031 | B2 | 5/2007 |

OTHER PUBLICATIONS

European Search Report and Written Opinion for European Application No. EP 12 19 8136 completed on Aug. 21, 2013.
International Search Report and Written Opinion for International Application No. PCT/US2012/071906 completed on Aug. 22, 2013.
Kandebo; Geared-Turbofan Engine Design Targets Cost, Complexity, Aviation Week & Space Technology; New York; Feb. 23, 1998, 4 pp.
Hendricks et al, "Performance and Weight Estimates for an Advanced Open Rotor Engine" NASA/TM-2012-217710, Sep. 2012, 20 pp.
Gunston, "Jane's Aero-Engines" Pratt & Whitney/USA, Mar. 2000, JAEng-Issue 7, 5 pp.
Zalud, "Gears Put a New Spin on Turbofan Performance" Machine Design, Nov. 5, 1998, 2010Penton Media, Inc., 5 pp.
Japanese Office Action for Japanese Application No. 2007-202444, Aug. 3, 2010.
European Search Report for EP Application No. 07253078.5, Dec. 5, 2007.
Meier, N. (2005). Civil Turbojet/Turbofan Specifications. Retrieved from http://www.jet-engine.net/civtfspec.html.
International Preliminary Report on Patentability for PCT Application No. PCT/US2012/071906 mailed Jul. 24, 2014.

* cited by examiner

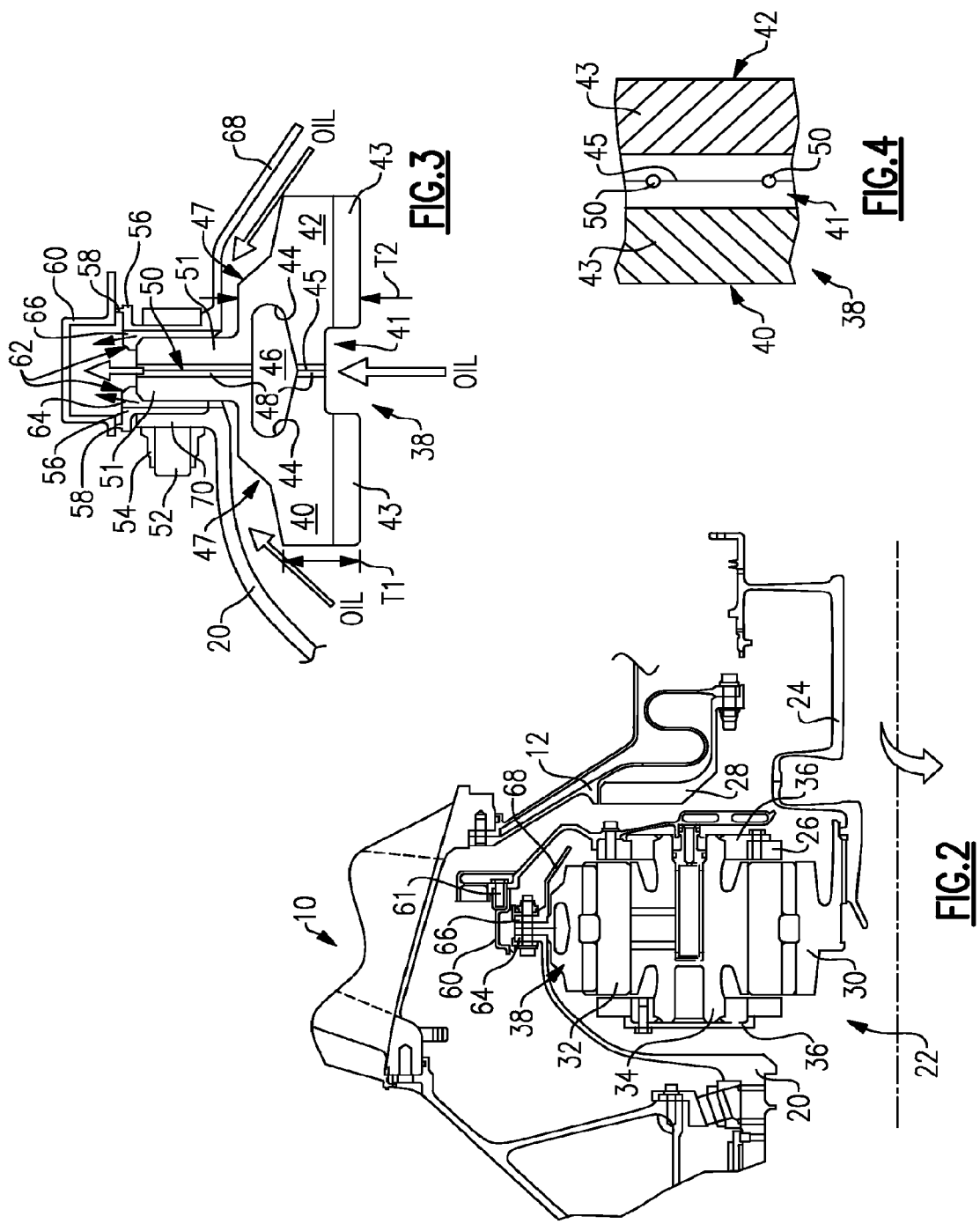

US 8,939,864 B2

GAS TURBINE ENGINE LUBRICATION

CROSS REFERENCE TO RELATED APPLICATIONS

The present disclosure is a continuation-in-part of U.S. patent application Ser. No. 11/504,220, filed Aug. 15, 2006 now U.S. Pat. No. 8,753,243.

BACKGROUND OF THE INVENTION

This invention relates to a ring gear used in an epicyclic gear train of a gas turbine engine.

Gas turbine engines typically employ an epicyclic gear train connected to the turbine section of the engine, which is used to drive the turbo fan. In a typical epicyclic gear train, a sun gear receives rotational input from a turbine shaft through a compressor shaft. A carrier supports intermediate gears that surround and mesh with the sun gear. A ring gear surrounds and meshes with the intermediate gears. In arrangements in which the carrier is fixed against rotation, the intermediate gears are referred to as "star" gears and the ring gear is coupled to an output shaft that supports the turbo fan.

Typically, the ring gear is connected to the turbo fan shaft using a spline ring. The spline ring is secured to a flange of the turbo fan shaft using circumferentially arranged bolts. The spline ring includes splines opposite the flange that supports a splined outer circumferential surface of the ring gear. The ring gear typically includes first and second portions that provide teeth facing in opposite directions, which mesh with complimentary oppositely facing teeth of the star gears.

An epicyclic gear train must share the load between the gears within the system. As a result, the splined connection between the ring gear and spline ring is subject to wear under high loads and deflection. Since the spline connection requires radial clearance, it is difficult to get a repeatable balance of the turbo fan assembly. Balance can also deteriorate over time with spline wear.

SUMMARY OF THE INVENTION

A disclosed example turbine engine according to an exemplary embodiment includes a fan shaft and at least one tapered bearing mounted on the fan shaft. The fan shaft including at least one radially extending passage adjacent the at least one tapered bearing and a fan mounted for rotation on the tapered bearing. An epicyclic gear train is coupled to drive the fan and includes a carrier supporting star gears that mesh with a sun gear, and a ring gear surrounding and meshing with the star gears, each of the star gears being supported on a respective journal bearing. The epicyclic gear train defines a gear reduction ratio of greater than or equal to about 2.3.

In a further embodiment of the foregoing turbine engine the fan shaft is coupled to the ring gear.

In a further embodiment of the foregoing turbine engine the at least one tapered bearing includes a first tapered bearing and the at least one radially extending passage that includes a first passage and a second passage. The first passage is located at an axially aft side of the first tapered bearing and the second passage is located at an axially forward side of the first tapered bearing.

In a further embodiment of the foregoing turbine engine the fan shaft includes on a radially inner surface, at least one well extending between axial sides and a radial side, and the at least one passage opens at the radial side.

In a further embodiment of the foregoing turbine engine, the fan shaft includes, on a radially inner surface, a plurality of wells each extending between axial side walls and a radial side wall, and the at least one passage includes a plurality of passages that open at respective ones of the radial side walls of the plurality of wells.

In a further embodiment of the foregoing turbine engine, two wells of the plurality of wells are axially adjacent such that the two wells share a common axial side wall.

In a further embodiment of the foregoing turbine engine the axial side walls are gradually sloped.

In a further embodiment of the foregoing turbine engine the epicyclic gear train has a gear reduction ratio of greater than or equal to 2.3.

In a further embodiment of the foregoing the turbine engine, the epicyclic gear train has a gear reduction ratio of greater than or equal to about 2.5.

In a further embodiment of the foregoing, the turbine engine, the epicyclic gear train has a gear reduction ratio of greater than or equal to 2.5.

In a further embodiment of the foregoing, the turbine engine, the fan defines a bypass ratio of greater than about ten (10) with regard to a bypass airflow and a core airflow.

In a further embodiment of the foregoing, the turbine engine, the fan defines a bypass ratio of greater than about ten (10) with regard to a bypass airflow and a core airflow.

In a further embodiment of the foregoing turbine engine, the fan defines a bypass ratio of greater than about 10.5:1 with regard to a bypass airflow and a core airflow.

In a further embodiment of the foregoing the turbine engine, the fan has a pressure ratio that is less than about 1.45.

In a further embodiment of the foregoing the turbine engine, the fan has a pressure ratio that is that is less than 1.45.

Although different examples have the specific components shown in the illustrations, embodiments of this invention are not limited to those particular combinations. It is possible to use some of the components or features from one of the examples in combination with features or components of another of the examples.

These and other features disclosed herein can be best understood from the following specification and drawings, the following of which is a brief description.

BRIEF DESCRIPTION OF THE DRAWINGS

FIG. 2 is an enlarged cross-sectional view of the epicyclic gear train shown in FIG. 1.

FIG. 3 is an enlarged cross-sectional view of an example ring gear similar to the arrangement shown in FIG. 2.

FIG. 4 is a view of the ring gear shown in FIG. 3 viewed in a direction that faces the teeth of the ring gear in FIG. 3.

DETAILED DESCRIPTION

Figure 1:
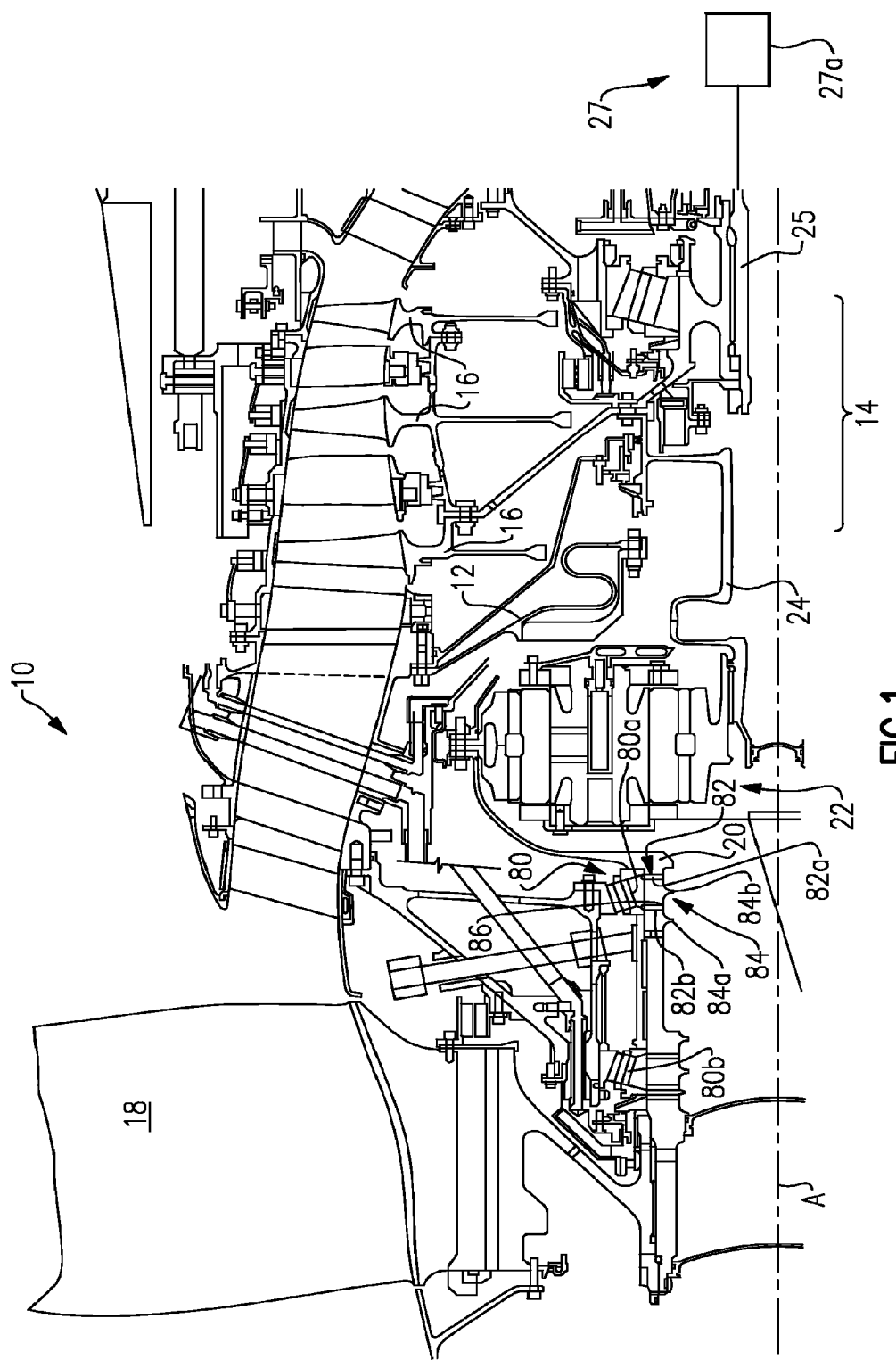
FIG. 1 is a partial cross-sectional view of a front portion of a gas turbine engine illustrating a turbo fan, epicyclic gear train and a compressor section.

A portion of a gas turbine engine 10 is shown schematically in FIG. 1. The turbine engine 10 includes a fixed housing 12 that is constructed from numerous pieces secured to one another. A compressor section 14 having compressor hubs 16 with blades are driven by a turbine shaft 25 and turbine section 27 about an axis A. A turbo fan 18 is supported on a turbo fan shaft 20 that is driven by a compressor shaft 24, which supports the compressor hubs 16, through an epicyclic gear train 22.

In the example arrangement shown, the epicyclic gear train 22 is a star gear train. Referring to FIG. 2, the epicyclic gear train 22 includes a sun gear 30 that is connected to the compressor shaft 24, which provides rotational input, by a splined connection. A carrier 26 is fixed to the housing 12 by a torque frame 28 using fingers (not shown) known in the art. The carrier 26 supports star gears 32 using journal bearings 34 that are coupled to the sun gear 30 by meshed interfaces between the teeth of sun and star gears 30, 32. Multiple star gears 32 are arranged circumferentially about the sun gear 30. Retainers 36 retain the journal bearings 34 to the carrier 26. A ring gear 38 surrounds the carrier 26 and is coupled to the star gears 32 by meshed interfaces. The ring gear 38, which provides rotational output, is secured to the turbo fan shaft 20 by circumferentially arranged fastening elements, which are described in more detail below.

As shown, the fan shaft 20 is coupled to the ring gear 38 of the epicyclic gear train 22 and the fan 18 is mounted for rotation on the fan shaft 20. The fan 18 is supported on at least one tapered roller bearing 80 (FIG. 1). As shown, the at least one tapered roller bearing 80 includes tapered races such that axes of rotation of rollers supported on the races are transversely angled relative to the axis A of the engine 10.

In this example, there is a first tapered roller bearing 80a and a second, axially spaced tapered roller bearing 80b. The fan shaft 20 includes at least one radially extending passage 82 adjacent and in communication with the at least one tapered bearing 80. In one example, the at least one radially extending passage 82 includes a first passage 82a and a second passage 82b. The first passage 82a is located at an axially aft side of the first tapered bearing 80a and the second passage 82b is located at an axially forward side of the first tapered bearing 80a, to provide lubricant to the first tapered bearing 80a. That is, lubricant is provided to the radial interior portion of the fan shaft 20, to lubricate and cool the first tapered bearing 80a. It is to be understood that the second tapered bearing 80b is similarly arranged with regard to additional radially extending passages through the fan shaft 20.

As shown in FIG. 1, the fan shaft 20 includes, on a radially inner surface, at least one well 84 that extends between axial side walls 84a/84b and a radial wall 86. The at least one passage 82 opens at the radial side 86. In this example, there are two wells that feed, respectively, the first passage 82a and the second passage 82b. The two wells are axially adjacent such that they share a common axial side wall 84b. The axial side walls 84a/84b are gradually sloped to funnel lubricant to the radial wall 86 and thus into the corresponding passage 82a or 82b, for example.

In one disclosed, non-limiting embodiment, the engine 10 has a bypass ratio that is greater than about six (6) to ten (10), the epicyclic gear train 22 is a planetary gear system or other gear system with a gear reduction ratio of greater than about 2.3 or greater than about 2.5, and a low pressure turbine 27a of the turbine section 27 of the engine 10 has a pressure ratio that is greater than about 5. In one disclosed embodiment, the engine 10 bypass ratio is greater than about ten (10:1) or greater than about 10.5:1, the turbofan 18 diameter is significantly larger than that of the low pressure compressor of the compressor section 14, and the low pressure turbine 27a has a pressure ratio that is greater than about 5:1. In one example, the epicyclic gear train 22 has a gear reduction ratio of greater than about 2.3:1 or greater than about 2.5:1. It should be understood, however, that the above parameters are only exemplary of one embodiment of a geared architecture engine and that the present invention is applicable to other gas turbine engines including direct drive turbofans.

A significant amount of thrust is provided by a bypass flow B due to the high bypass ratio. The fan 18 of the engine 10 is designed for a particular flight condition—typically cruise at about 0.8 M and about 35,000 feet. The flight condition of 0.8 M and 35,000 ft, with the engine at its best fuel consumption—also known as "bucket cruise TSFC"—is the industry standard parameter of lbm of fuel being burned divided by lbf of thrust the engine produces at that minimum point. "Low fan pressure ratio" is the pressure ratio across the fan blade alone. The low fan pressure ratio as disclosed herein according to one non-limiting embodiment is less than about 1.45. "Low corrected fan tip speed" is the actual fan tip speed in ft/sec divided by an industry standard temperature correction of $[(Tambient\ deg\ R)/518.7]^{0.5}$. The "Low corrected fan tip speed" as disclosed herein according to one non-limiting embodiment is less than about 1150 ft/second.

Referring to FIGS. 3 and 4, the ring gear 38 is a two-piece construction having first and second portions 40, 42. The first and second portions 40, 42 abut one another at a radial interface 45. A trough 41 separates oppositely angled teeth 43 (best shown in FIG. 4) on each of the first and second portions 40, 42. The arrangement of teeth 43 forces the first and second portions 40, 42 toward one another at the radial interface 45. The back side of the first and second portions 40, 42 includes a generally S-shaped outer circumferential surface 47 that, coupled with a change in thickness, provides structural rigidity and resistance to overturning moments. The first and second portions 40, 42 have a first thickness T1 that is less than a second thickness T2 arranged axially inwardly from the first thickness T1. The first and second portions 40, 42 include facing recesses 44 that form an internal annular cavity 46.

The first and second portions 40, 42 include flanges 51 that extend radially outward away from the teeth 43. The turbo fan shaft 20 includes a radially outwardly extending flange 70 that is secured to the flanges 51 by circumferentially arranged bolts 52 and nuts 54, which axially constrain and affix the turbo fan shaft 20 and ring gear 38 relative to one another. Thus, the spline ring is eliminated, which also reduces heat generated from windage and churning that resulted from the sharp edges and surface area of the splines. The turbo fan shaft 20 and ring gear 38 can be rotationally balanced with one another since radial movement resulting from the use of splines is eliminated. An oil baffle 68 is also secured to the flanges 51, 70 and balanced with the assembly.

Seals 56 having knife edges 58 are secured to the flanges 51, 70. The first and second portions 40, 42 have grooves 48 at the radial interface 45 that form a hole 50, which expels oil through the ring gear 38 to a gutter 60 that is secured to the carrier 26 with fasteners 61 (FIG. 2). The direct radial flow path provided by the grooves 48 reduces windage and churning by avoiding the axial flow path change that existed with splines. That is, the oil had to flow radially and then axially to exit through the spline interface. The gutter 60 is constructed from a soft material such as aluminum so that the knife edges 58, which are constructed from steel, can cut into the aluminum if they interfere. Referring to FIG. 3, the seals 56 also include oil return passages 62 provided by first and second slots 64 in the seals 56, which permit oil on either side of the ring gear 38 to drain into the gutter 60. In the example shown in FIG. 2, the first and second slots 64, 66 are instead provided in the flange 70 and oil baffle 68, respectively.

Although embodiments of this invention have been disclosed, a worker of ordinary skill in this art would recognize that certain modifications would come within the scope of this invention. For that reason, the following claims should be studied to determine the true scope and content of this invention.

What is claimed is:
1. A turbine engine comprising:
a fan shaft;

at least one tapered bearing mounted on the fan shaft, the fan shaft including at least one radially extending passage adjacent the at least one tapered bearing;

a fan mounted for rotation on the tapered bearing;

an epicyclic gear train coupled to drive the fan, the epicyclic gear train including a carrier supporting intermediate gears that mesh with a sun gear, and a ring gear surrounding and meshing with the intermediate gears, each of the intermediate gears being supported on a respective journal bearing, wherein the epicyclic gear train defines a gear reduction ratio of greater than or equal to about 2.3; and a turbine section coupled to drive the fan through the epicyclic gear train, the turbine section having a low pressure turbine that includes a pressure ratio that is greater than about 5, the fan includes a pressure ratio that is less than about 1.45, and the fan has a bypass ratio of greater than about ten (10).

2. The turbine engine as recited in claim 1, wherein the fan shaft is coupled to the ring gear.

3. The turbine engine as recited in claim 1, wherein the at least one tapered bearing includes a first tapered bearing and the at least one radially extending passage includes a first passage and a second passage, the first passage being located at an axially forward side of the first tapered bearing and the second passage being located at an axially aft side of the first tapered bearing.

4. The turbine engine as recited in claim 1, wherein the fan shaft includes, on a radially inner surface, at least one well extending between axial sides and a radial side, and the at least one passage opens at the radial side.

5. The turbine engine as recited in claim 1, wherein the fan shaft includes, on a radially inner surface, a plurality of wells each extending between axial side walls and a radial side wall, and the at least one passage includes a plurality of passages that open at respective ones of the radial side walls of the plurality of wells.

6. The turbine engine as recited in claim 5, wherein two wells of the plurality of wells are axially adjacent such that the two wells share a common axial side wall.

7. The turbine engine as recited in claim 5, wherein the axial side walls are gradually sloped.

8. The turbine engine as recited in claim 1, wherein the epicyclic gear train has a gear reduction ratio of greater than or equal to 2.3.

9. The turbine engine as recited in claim 1, wherein the epicyclic gear train has a gear reduction ratio of greater than or equal to about 2.5.

10. The turbine engine as recited in claim 1, wherein the epicyclic gear train has a gear reduction ratio of greater than or equal to 2.5.

11. The turbine engine as recited in claim 1, wherein the fan defines a bypass ratio of greater than about 10.5:1 with regard to a bypass airflow and a core airflow.

12. The turbine engine as recited in claim 1, further comprising a turbine section coupled to drive the fan through the epicyclic gear train, the turbine section having a low pressure turbine that includes a pressure ratio that is greater than about 5, the fan includes a pressure ratio that is less than about 1.45, and the fan has a bypass ratio of greater than about ten (10).

* * * * *